US011852651B2

(12) United States Patent
Marenz et al.

(10) Patent No.: US 11,852,651 B2
(45) Date of Patent: Dec. 26, 2023

(54) SYSTEM AND METHOD FOR DETERMINING ACCELEROMETER ORIENTATION

(71) Applicant: WEBFLEET SOLUTIONS B.V., Amsterdam (NL)

(72) Inventors: Martin Marenz, Amsterdam (NL); Christian Meissner, Amsterdam (NL)

(73) Assignee: Bridgestone Mobility Solutions B.V., Amsterdam (NL)

( * ) Notice: Subject to any disclaimer, the term of this patent is extended or adjusted under 35 U.S.C. 154(b) by 0 days.

(21) Appl. No.: 17/275,956

(22) PCT Filed: Sep. 16, 2019

(86) PCT No.: PCT/EP2019/074691
§ 371 (c)(1),
(2) Date: Mar. 12, 2021

(87) PCT Pub. No.: WO2020/053444
PCT Pub. Date: Mar. 19, 2020

(65) Prior Publication Data
US 2022/0057428 A1    Feb. 24, 2022

(30) Foreign Application Priority Data

Sep. 14, 2018  (GB) ...................................... 1814966

(51) Int. Cl.
*G01P 15/18*    (2013.01)
*G01S 19/52*    (2010.01)

(52) U.S. Cl.
CPC .............. *G01P 15/18* (2013.01); *G01S 19/52* (2013.01)

(58) Field of Classification Search
CPC ....................................................... G01P 15/18
See application file for complete search history.

(56) References Cited

U.S. PATENT DOCUMENTS 8,892,385 B2   11/2014  Van den Bergh
9,658,079 B2    5/2017  Schmidt et al.
(Continued)

FOREIGN PATENT DOCUMENTS

EP    2452156        5/2012
GB    2579558 A  *  7/2020  ............ B60W 40/09
(Continued)

OTHER PUBLICATIONS

United Kingdom Intellectual Property Office: Search report dated Jan. 18, 2019 for Application No. GB181966.6, 4 pages.
(Continued)

*Primary Examiner* — Walter L Lindsay, Jr.
*Assistant Examiner* — Andrew V Do
(74) *Attorney, Agent, or Firm* — Patterson IP Law

(57) ABSTRACT

Disclosed is a method for determining the installation orientation of an accelerometer system relative to a vehicle within which it has been installed. The method comprises obtaining a plurality of acceleration measurements within the co-ordinate frame of the accelerometer system and then analysing the distribution of these measurements to determine the relative installation orientation. In particular, the measurements can be grouped according to the vehicle movement phase at which they were obtained and the measurements within the groups then used to determine the lateral and horizontal planes of the vehicle.

16 Claims, 6 Drawing Sheets

(56) References Cited

U.S. PATENT DOCUMENTS

| | | | |
|---|---|---|---|
| 9,786,103 | B2 | 10/2017 | Menon et al. |
| 9,958,473 | B1 | 5/2018 | Sljivar et al. |
| 2015/0006099 | A1 | 1/2015 | Pham et al. |
| 2015/0007632 | A1 | 1/2015 | Welch et al. |
| 2015/0233718 | A1 | 8/2015 | Grokop |
| 2015/0332518 | A1 | 11/2015 | Menon et al. |
| 2016/0047836 | A1* | 2/2016 | Jones .................. G01C 25/005 702/150 |

FOREIGN PATENT DOCUMENTS

| | | |
|---|---|---|
| WO | 200017607 A1 | 3/2000 |
| WO | 2011003461 A1 | 1/2011 |
| WO | 2014177888 A1 | 11/2014 |

OTHER PUBLICATIONS

Nternational Searching Authority: Search report for co-pending International Patent Application No. PCT/EP2019/074691, dated Nov. 26, 2019, 26 pages.

\* cited by examiner

SYSTEM AND METHOD FOR DETERMINING ACCELEROMETER ORIENTATION

FIELD OF THE INVENTION

The present invention relates to accelerometer systems for installation within vehicles, and particularly to methods for determining the orientation of an accelerometer system relative to a vehicle within which the accelerometer system is installed.

BACKGROUND TO THE INVENTION

Navigation devices that include GPS (Global Positioning System) signal reception and processing functionality are well known and are widely employed as in-car or other vehicle navigation systems. In general terms, a modern navigation device may comprise a processor, memory (at least one of volatile and non-volatile, and commonly both), and map data stored within said memory. Such navigation devices are generally able to process GPS location data in order to determine a current location of the device.

Such navigation devices often also include, or have access to, one or more accelerometer(s) that are capable of producing signals that can be processed to determine the current acceleration of the device (and hence of the vehicle within which the device is mounted). These acceleration signals may be used in turn, often in conjunction with other location information, derived from the GPS signal, for example, to determine the velocity and relative displacement of the device (vehicle). The accelerometer data may thus be used to supplement the navigation functionality of the vehicle navigation system and the accelerometer(s) may be provided alongside, or as part of, the navigation system.

In other cases, the accelerometers may be provided in a separate "black box" that does not provide any navigation function but instead merely logs acceleration data (and optionally other vehicle data). This data can then be stored and/or transmitted to a remote (central) server, for example, for monitoring purposes. For instance, such devices, which may generally be referred to as 'telematics' devices, are often provided for the purpose of monitoring fleets of commercial vehicles such as lorries, buses, taxis, and the like. In this case, the accelerometer data may be used for monitoring driver and/or vehicle behaviour. For example, the accelerometer data may be used for indicating the occurrence of any exceptional driving events, for example, harsh braking or acceleration, swerving or other emergency manoeuvres, as well as for vehicle crash detection, standstill detection, vehicle theft, and so on.

Accelerometer data may also be provided to on-board autonomous or advanced driver-assistance modules. For instance, in a similar manner as described above, the accelerometer data may be used to determine driver behaviour which may in turn be fed into the autonomous or advanced driver assistance modules in order to improve (or modify) the driving experience.

In order to correctly process the signals (data) from an accelerometer it is necessary to (accurately) know the orientation of the accelerometer relative to the vehicle's frame of reference. This is often not known a priori, especially as the relative orientation of the accelerometer within the system or box may itself often be unknown.

The orientation of an accelerometer may be determined manually when the device including the accelerometer is being installed and fixed into a vehicle by the installer (e.g. during the vehicle manufacture, or subsequently by a skilled mechanic). For instance, during the installation process, all of the relevant environmental conditions may be known, or controlled, such that the accelerometer can be reliably calibrated. For example, the calibration could be performed on known level ground.

However, such manual calibrations may be relatively time-consuming. Furthermore, if the initial calibration is carried out inaccurately, or if the orientation of the device including the accelerometer changes after installation, there may be persistent, systematic inaccuracies in operation of the device. Also, when the calibration is only performed during installation in a well-controlled environment when the vehicle is stationary, any subsequent variations in operating and/or environmental conditions, such as temperature fluctuations, may distort the measured acceleration data.

Thus, it is desired to be able to more rapidly and reliably determine the orientation of the accelerometer(s) once installed.

SUMMARY OF THE INVENTION

According to a first aspect of the present invention, there is provided a method for determining an orientation of an accelerometer system relative to a vehicle within which it is installed, wherein the accelerometer system is a multi-axial accelerometer system capable of measuring acceleration values for each of the axes of the accelerometer system to provide acceleration measurements in the co-ordinate frame of the accelerometer system, the method comprising:
  obtaining a plurality of acceleration measurements from the accelerometer system whilst the vehicle is moving, wherein each of the acceleration measurements is representative of an acceleration as measured within the co-ordinate frame of the accelerometer system; and
  analysing a distribution of the accelerations as measured within the co-ordinate frame of the accelerometer to determine an orientation of the accelerometer system relative to the vehicle within which it is installed.

According to another aspect of the present invention, there is provided a method for determining an orientation of an accelerometer system relative to a vehicle within which it is installed, wherein the accelerometer system is a multi-axial accelerometer system capable of measuring acceleration values for each of the axes of the accelerometer system to provide an acceleration measurement in the co-ordinate frame of the accelerometer system, the method comprising:
  obtaining a plurality of acceleration measurements from the accelerometer system whilst the vehicle is moving, wherein each of the acceleration measurements is representative of an acceleration as measured within the co-ordinate frame of the accelerometer system; grouping at least some of the acceleration measurements according to whether the measurements were obtained during an acceleration phase, or
  during a deceleration phase;
  analysing a distribution of the accelerations as measured within the co-ordinate frame of the accelerometer and using the distribution of the accelerations within the groups to determine an orientation of the accelerometer system relative to the vehicle within which it is installed.

The present invention recognises that the distribution of acceleration measurements provided by a multi-axis accelerometer system that is installed within a moving vehicle is dependent on the orientation of the accelerometer system with respect to the vehicle such that the relative orientation of the accelerometer system within the vehicle can then be determined from an analysis of the distribution of the 'raw' measurements made by the accelerometer system (i.e. the accelerations measured by the accelerometer system in its own reference frame). For example, the present invention recognises that the majority of acceleration measurements obtained whilst the vehicle is moving tend to lie along the longitudinal axis of the vehicle since this is the primary axis of vehicle movement. Similarly, the majority of the acceleration measurements should lie on a well-defined horizontal plane whose position with respect to the origin of the vehicle reference frame is determined by the magnitude and direction of the local gravity vector. Thus, the underlying properties of the distribution can be used to directly determine the relative orientation of the accelerometer system in the vehicle's reference frame.

As will be described further below, analysing the distribution of the acceleration measurements within the co-ordinate frame of the accelerometer may involve recognising clusters or groups of acceleration data. More specifically, analysing the distribution of the acceleration measurements within the co-ordinate frame of the accelerometer may comprise grouping the acceleration measurements according to one or more directions along which the measurements are seen to lie. For example, acceleration measurements may be grouped together where they are seen to be distributed preferentially along a certain direction within the co-ordinate frame of the accelerometer. It has been found that the majority of the acceleration measurements tend to lie along a direction corresponding to the longitudinal axis of the vehicle, since this is the primary axis of vehicle motion. This can allow groups of acceleration measurements during an acceleration or deceleration phase to be distinguished from acceleration measurements obtained during a uniform movement phase.

Accordingly, by analysing the distribution of the acceleration measurements within the reference frame of the accelerometer system, it is possible to determine information that is reflective of, and can thus be used to determine, the orientation of the accelerometer with respect to the vehicle's frame of reference. Once the orientation of the accelerometer system has been determined, accelerations as measured by the accelerometer system in its own reference frame can then be suitably transformed into the vehicle's frame of reference, as desired, and thus used to infer information regarding the vehicle's movement in the real-world, e.g. for supporting navigation functionality and/or monitoring driver behaviour, or for any other suitable applications wherein accelerometer data may suitably be provided either to a system (or user) of the vehicle or some other third party, e.g. depending on the application.

Compared to other techniques, the Applicants believe that the present invention, at least according to its preferred embodiments, may allow the orientation of an accelerometer system relative to a vehicle within which it is installed to be determined relatively quickly and in a more robust manner. According to the present techniques, the orientation may also be able to be determined with a relatively higher accuracy and/or using fewer data points than other techniques.

For instance, an example of an existing technique for determining accelerometer orientations is described in WO 2011/003461 A1 (TomTom International B.V.), published 13 Jan. 2011. In the technique described in this reference, a plurality of acceleration samples are collected during vehicle standstill and used to compute an average gravitation vector. Based on this average gravitation vector, the angle of rotation between the accelerometer and the horizontal vehicle plane can thus be determined.

The technique described in WO 2011/003461 A1 could then be extended to also determine average acceleration and braking direction vectors based on measurements during vehicle acceleration and braking phases, respectively (which may be distinguished, for example, based on provided speed signals). However, if the angle of rotation between the accelerometer and the horizontal vehicle plane subsequently changes, e.g. due to movement of the accelerometer, or some change in environmental conditions, the technique would then have to be repeated entirely from the beginning, with the average gravitation vector having to be re-determined by obtaining a new set of measurements of the accelerations when the vehicle is stationary, and so on.

Thus, it will be appreciated that the technique described in WO 2011/003461 A1 represents a significant improvement, e.g. compared to prior manual calibration techniques. However, the Applicants believe that there still remains scope for improvement, at least for some applications.

For instance, the technique described in WO 2011/003461 A1 does not determine the orientation directly and is instead based on taking the gravity vector as an input for the orientation determination. However, this can introduce inaccuracies due to the unknown variations in ground level. In order to mitigate this problem, the technique in WO 2011/003461 A1 thus relies on obtaining a relatively larger number of measurements whilst the vehicle is stationary from a range of different locations to try to effectively average out differences in the ground level (inclination). However, this can still be relatively time consuming, and can be relatively complex to implement.

By contrast, it will be appreciated that, so long as there are a sufficient number of acceleration measurements to provide a suitable distribution that can be analysed, e.g. as described herein, the present invention may allow the relative orientation of the accelerometer system to be determined directly. An initial determination of the orientation can thus be made relatively quickly, and the determined orientation can thus be updated, as desired, as and when new accelerometer measurements are obtained that may alter the distribution. In this way, the orientation determination can be refined as more measurements are obtained, or re-calculated, as necessary, e.g. to account for changes in the orientation and/or environmental conditions over time. Additionally, the present invention may in embodiments be able to automatically compensate for distortions in the installation procedure after the installation process. Furthermore, the techniques described herein rely on the properties of the underlying distribution of the acceleration measurements and may therefore be less affected by variability in the ground level.

Thus, it will be appreciated that the present invention may provide further improvements compared to techniques such as those described in WO 2011/003461 A1, and may, for example, be able to determine the orientation more rapidly and/or in a more robust and accurate manner.

The present invention also extends to apparatuses for performing such methods. Accordingly, from a second aspect there is provided an apparatus comprising a multi-axial accelerometer system capable of measuring acceleration values for each of the axes of the accelerometer system to provide an acceleration measurement in the co-ordinate frame of the accelerometer system; and one or more processor(s) operable to:

obtain a plurality of acceleration measurements from the accelerometer system whilst the vehicle is moving, wherein each of the acceleration measurements is representative of an acceleration as measured within the co-ordinate frame of the accelerometer system; and analyse a distribution of the accelerations as measured within the co-ordinate frame of the accelerometer to determine an orientation of the accelerometer system relative to the vehicle within which it is installed.

In at least some embodiments, the one or more processor(s) are operable to:

group the acceleration measurements according to whether the measurements were obtained
during an acceleration phase, or
during a deceleration phase;
and use the distribution of the accelerations within the groups to determine the orientation of the accelerometer system relative to the vehicle within which it is installed.

In at least some embodiments, the one or more processor(s) are operable to:

further group the acceleration measurements according to whether the measurements were obtained during a uniform movement phase when the vehicle was moving at a substantially constant non-zero speed.

This second aspect of the present invention can and preferably does include any one or more or all of the preferred and optional features of the invention described herein in respect of the first aspect in any of its embodiments of the invention, as appropriate. For example, even if not explicitly stated, the apparatus may comprise means for carrying out any step or steps described in relation to the method herein in any of its aspects or embodiments, and vice versa.

The means for carrying out any of the steps described in relation to the method or apparatus may comprise a set of one or more processor(s) and/or suitable processing circuitry. The present invention is therefore preferably a computer implemented invention, and any of the steps described in relation to any of the aspects or embodiments of the invention may be carried out under the control of a set of one or more processor(s) and/or suitable processing circuitry.

The processor(s) may be provided as part of the accelerometer system that is installed within the vehicle. For example, the accelerometer system may comprise a set of one or more processor(s), or processing circuitry, that is operable to use and process the acceleration measurements in the manner of the present invention. Alternatively, the accelerometer measurements may be provided from the accelerometer system to another on-board processing module of the vehicle (which may e.g. comprise a navigation system or autonomous or advanced driver-assistance module). Thus, the processing of the present invention may be performed on-board the vehicle. However, it is also contemplated that the apparatus and/or one or more processor(s) and/or processing circuitry may be at least part of a server.

The steps of the method of the present invention in any of its aspects or embodiments may therefore be carried out in part by a (remote) server. For example, the acceleration measurements may be provided from the accelerometer system to a server, and the server may then process the obtained measurements in the manner of the present invention. The accelerometer system may thus comprise suitable transmission circuitry, for example, for transmitting the measurements to the server.

Thus, the steps of the method may be performed exclusively on-board the vehicle, exclusively on a server, or some on a server and the others on an on-board device in any combination.

The accelerometer system is installed, in use, within a vehicle. Typically, the accelerometer system may be installed within a road vehicle such as a car, lorry, bus, or the like. However, it will be appreciated that the techniques described herein may also more generally be applied to any suitable type of vehicle within which an accelerometer system may desirably be installed.

The accelerometer system may be (semi-)permanently installed within the vehicle, e.g. during manufacture, requiring a skilled mechanic to fit the accelerometer system such that it cannot then be easily removed by a normal user. However, it is also contemplated that the accelerometer system may be removably mounted, or carried, within the vehicle. For example, this may particularly be the case wherein the accelerometer system is provided as part of a portable navigation device, or a data logger (e.g. a "black box" telematics device).

The accelerometer system used for the present invention is a so-called "multi-axial" accelerometer system, i.e. an accelerometer system that is capable of measuring acceleration (values) for each of the axes of the accelerometer system to provide a measurement of the acceleration within the co-ordinate frame of the accelerometer system. Thus, it will be appreciated that the accelerometer system measures "proper" accelerations, i.e. the accelerations in its own reference frame. Each of the acceleration measurements therefore has an associated co-ordinate within the accelerator frame of reference, i.e. defined with respect to the axes of the accelerometer co-ordinate frame. In use, the accelerometer system is thus operable to obtain a plurality of acceleration measurements. These measurements will naturally have a certain spatial distribution within the co-ordinate frame of the accelerometer system.

Preferably, the accelerometer system is capable of measuring accelerations in three-dimensions (a "three-axis" accelerometer system). The distribution of the accelerations in three-dimensions may be processed to fully determine the orientation of the accelerometer system relative to the vehicle within which it is installed. However, in principle, a two-dimensional ("two-axis") accelerometer system could be used to (at least partly) determine the installation orientation of the accelerometer system. For instance, the distribution of acceleration measurements within a two-dimensional plane will still depend on the relative orientation of the accelerometer system and so a two-dimensional distribution can still be processed to at least partly determine the orientation (e.g. to determine (only) one of the longitudinal/lateral orientation).

Thus, preferably, each of the acceleration measurements obtained from the accelerometer system comprises an acceleration vector having components along each of the (orthogonal) axes of the accelerometer system. For instance, for a three-axis accelerometer, each of the acceleration measurements comprises an acceleration value for each of the three axes (e.g. x, y, z). In this case, the acceleration measurements may thus comprise an acceleration vector, e.g. with components $(a_x, a_y, a_z)$.

The accelerometer system generally comprises a set of one or more accelerometers. Each accelerometer is able to provide an output that is related to the acceleration force along one or more axis (axes) of the accelerometer. For example, preferably, the accelerometer system comprises a single multi-axis accelerometer. In this case, the measurements obtained from this single accelerometer may provide the multi-dimensional distribution. However, it is also contemplated that a multi-axis accelerometer may comprise a suitably (orthogonally) arranged set of two or more single axis accelerometers. That is, a plurality of (single axis) accelerometers may be provided together in order to provide the multi-axis accelerometer system. In this case, each of the single axis accelerometers may define an axis of the co-ordinate frame of the accelerometer system, and the respective measurements from the plurality of accelerometers may thus be combined to give a single acceleration measurement in the co-ordinate frame of the accelerometer system.

In general, the accelerometer(s) may comprise either analogue or digital acceleration sensors and can be of any suitable type. For instance, the accelerometer system may generally comprise either (or both of) an angular or a linear accelerometer. That is, the accelerometer system may provide signals that can be processed to determine either an angular and/or linear acceleration. Thus, the co-ordinate frame of the accelerometer system may without limitation comprise a Cartesian co-ordinate system (e.g., so that the accelerometer system has x, y and z axes), or a polar, or any other, co-ordinate system suitable for describing the positions of the acceleration measurements.

The accelerometer may substantially continuously provide as output data representative of the accelerometer measurements. The acceleration measurements may be performed at a single instant, or may be averaged over a period of time. The averaging can be performed by the accelerometer itself or by a suitable accelerometer processing module.

Because the accelerometer system measures (proper) accelerations in its own reference frame, to be able to relate the sensory data of the accelerometer system to the vehicle it is installed within, it is necessary to be able to determine the relative orientation of the accelerometer system with respect to the vehicle frame. Conventionally, this is done during installation of the accelerometer system. However, this can be very time intensive and is prone to inaccuracy, either relating to the calibration process, or due to variations in the operating and/or environmental conditions after the initial installation.

Accordingly, it is desired to be able to determine the relative orientation of the accelerometer system in a more reliable manner. To this end, the Applicants have recognised that the relative orientation can be determined using the measurements obtained from the accelerometer system in use. This approach overcomes many of the problems associated with a manual calibration since an initial determination of the orientation can be made relatively quickly, and then reliably (re)determined over time, as necessary. In particular, the Applicants have now recognised that the distribution of the acceleration measurements obtained by the accelerator system when the vehicle is moving is generally dependent on the orientation of the accelerometer within the reference frame of the vehicle.

Thus, according to the present invention, a plurality of acceleration measurements are obtained from the accelerometer system whilst the vehicle is moving and the (distribution of these) obtained acceleration measurements can then be suitably processed to determine the orientation of the accelerometer system relative to the vehicle within which it is installed. That is, the underlying properties of the distribution of the acceleration measurements in the multi-dimensional co-ordinate space of the accelerator system are suitably processed to obtain information indicative of the relative orientation of the accelerator system with respect to the vehicle.

For example, and in particular, it has been found that the majority of the acceleration measurements tend to lie along the longitudinal axis of the vehicle, since this is the primary axis of vehicle motion. However, the distribution of acceleration measurements may be, and generally is, somewhat inhomogeneous, in part due to the unknown (and variable) ground level, so that in reality the acceleration measurements will not necessarily all lie along the longitudinal axis of the vehicle. For instance, all of the measurements should generally lie on a well-defined horizontal plane whose distance to the origin (as defined in the vehicle's reference frame) is representative of the local gravity magnitude. When the vehicle is cornering, the acceleration measurements may therefore be deflected within this plane orthogonally away from the longitudinal axis. On the other hand, a tilt of the vehicle due to changes in ground level (inclination) will cause this horizontal plane to rotate around the origin. These effects (and others) may therefore introduce inhomogeneity into the distribution of the measurements. This inhomogeneity may be particularly significant for measurements obtained during a uniform movement phase of the vehicle (when the vehicle is moving at a substantially constant speed), and (unless this inhomogeneity is accounted for) these measurements may generally be less suitable to be used as direct input data. Although uniform movement data is more reliable than data obtained during standstill, which is the primary data used in previous methods, the measurements obtained during a uniform movement phase of the vehicle is less reliable compared to acceleration/deceleration data. On the other hand, the acceleration measurements obtained during vehicle acceleration and deceleration phases will be dominated by the vehicle acceleration or deceleration and as such may be more narrowly distributed along the longitudinal axis of the vehicle. Thus, the acceleration measurements from these phases may be better suited to be processed to determine the vehicle's longitudinal orientation. Conversely, the acceleration measurements obtained during the uniform movement phases are better suited for determining the gravity vector (since these are effectively measurements of the local gravity as there is, by definition, little or no vehicle acceleration during the uniform movement phase). Accordingly, in order to more reliably determine the relative installation orientation, it is desirable to account for the inhomogeneity in the input distribution of acceleration measurements.

In WO 2011/003461 A1 the inhomogeneity in the vehicle standstill measurements due to the variations in ground level is mitigated by taking a relatively large number of measurements at different locations and then averaging these. With enough measurements from different locations, the variations in ground level should effectively be averaged out. However, this can be time consuming and is not necessarily accurate. Also, the techniques described in WO 2011/003461 may not be able to readily compensate for the effects of variations in ground level perpendicular to the driving direction, which may introduce a (small) bias to the determined reference frame. The present invention thus deals with this problem in a different way allowing for a more rapid and direct determination of the relative orientation.

In particular, according to embodiments of the present invention, the acceleration measurements are first classified into a plurality of groups (clusters) according to the movement phase of the vehicle at the time at which the acceleration measurements were obtained. For instance, the acceleration measurements may be (and preferably are) classified into a plurality of groups (clusters) according to whether the acceleration measurements were obtained during a period of substantially constant speed movement, or during a period of acceleration or deceleration.

For example, the measurements may be classified into (at least) three groups: a first group for measurements obtained when the vehicle is moving uniformly (e.g. at a substantially constant non-zero speed); a second group for measurements obtained when the vehicle is accelerating (speed is increasing); and a third group for measurements obtained when the vehicle is decelerating (speed is decreasing). That is, in embodiments, the method comprises grouping the acceleration measurements according to whether the measurements were obtained during a uniform movement phase when the vehicle was moving at a substantially constant non-zero speed, or during an acceleration or deceleration phase.

For example, at least some of the acceleration measurements may be classified into two groups: a first group for measurements obtained when the vehicle is accelerating (speed is increasing); and a second group for measurements obtained when the vehicle is decelerating (speed is decreasing). Those acceleration measurements that are not determined to fall into either the first group or the second group may optionally be classified into a third group for measurements obtained when the vehicle is moving uniformly (e.g. at a substantially constant non-zero speed).

The acceleration measurements may be classified, or grouped, using a speed signal representing the current speed and/or change in speed of the vehicle. The speed signal is preferably external and separate to the acceleration measurements. For instance, the speed signal may suitably be obtained from an on-board sensor such as a GPS sensor that is provided on the vehicle, or as part of the accelerometer system. However, in general, the speed signal may be obtained from any suitable speed sensor provided on the vehicle. The speed signal can then be provided to the processor for processing along with the acceleration measurements via a suitable standard interface such as a Controller Area Network (CAN), Fleet Management System (FMS) or On-board Diagnostic (OBD) interface.

Alternatively, or in addition, the acceleration measurements may be classified, or grouped, using an independent acceleration signal obtained from the vehicle and representing the current acceleration of the vehicle. However, this may require an independent acceleration signal to be provided by a separate accelerometer system or GPS device already mounted in the vehicle.

Thus, in some embodiments, the method comprises obtaining for each of the acceleration measurements a speed signal indicating a speed of the vehicle, and grouping the measured accelerations using the obtained speed signal. As new acceleration measurements are obtained over time, these may be added to the groups (and indeed older measurements may be removed from the groups). It will be appreciated that the distribution of measurements may therefore change over time. In this way, the accuracy of the orientation determination can be refined over time, or updated, e.g. in the event that the orientation changes.

Whether an acceleration measurement falls within a particular group (cluster) may thus be determined by comparing the change of speed to a predetermined threshold value, e.g. so that measurements obtained during periods of substantially constant speed are classified as uniform speed measurements, and so on. For example, if the change in speed is below a certain predetermined threshold value, the associated acceleration measurement may be classified as being part of a uniform movement phase, and grouped accordingly. On the other hand, if the change in speed is above the predetermined threshold value, the associated acceleration measurement may be classified as being part of an acceleration or deceleration movement phase (depending on whether the change in speed is positive or negative). The threshold for distinguishing constant speed from (low) acceleration or deceleration may be set as desired. Furthermore, the groups may overlap at least in part.

In some embodiments, alternatively or in addition, the method comprises obtaining for each of the acceleration measurements an independent acceleration signal from the vehicle, and grouping the measured accelerations using the obtained acceleration signal. Whether an acceleration measurement falls within a particular group (cluster) may be determined by comparing the independent acceleration signal to a predetermined threshold value, e.g. so that measurements obtained during periods of zero acceleration are classified as uniform speed measurements, and so on. For example, if the acceleration is below a certain predetermined threshold value, the associated acceleration measurement may be classified as being part of a uniform movement phase, and grouped accordingly. On the other hand, if the acceleration is above the predetermined threshold value, the associated acceleration measurement may be classified as being part of an acceleration or deceleration movement phase (depending on whether the acceleration is positive or negative). The threshold for distinguishing constant speed from (low) acceleration or deceleration may be set as desired. Furthermore, the groups may overlap at least in part.

Once the acceleration measurements have been suitably classified into the respective groups (clusters) based on the obtained speed or acceleration signals, the measurements within the different groups (clusters) can then be processed accordingly to determine the relative orientation of the accelerometer system with respect to the vehicle. That is, the present invention may comprise grouping the acceleration measurements according to whether the measurements were obtained (optionally) during a uniform movement phase when the vehicle was moving at a substantially constant non-zero speed, or during an acceleration or deceleration phase, and then using (e.g. analysing) the distribution of the accelerations within each of the groups to determine the orientation of the accelerometer system. In other words, rather than attempting to analyse the overall distribution of measurements, the present invention first groups the measurements according to the vehicle movement phase, and then uses these groups to determine the orientation of the accelerometer system.

For instance, the acceleration measurements obtained during vehicle acceleration and deceleration phases may suitably be used to determine the orientation of a lateral plane bisecting the vehicle along its longitudinal axis. Thus, in embodiments, the method comprises determining the orientation of a lateral plane of the vehicle using the measurements obtained during the acceleration and deceleration phases. As discussed above, these measurements will tend to lie along the longitudinal axis of the vehicle, and are thus well suited for this purpose. Furthermore, by selecting (only) the measurements obtained during vehicle acceleration and deceleration phases (and excluding measurements from uniform or standstill phases, which show a larger inhomogeneity, and cannot therefore reliably be used as direct input data) it is possible to more accurately determine the longitudinal orientation as the effects of variations in the ground level may be reduced.

Although uniform movement data (speed>0) is more reliable than data from standstill (speed=0), which is the primary data used by previous methods, the acceleration measurements obtained during the uniform movement are less reliable compared to acceleration/deceleration data. However, as is described further below, uniform movement data can be used, but with care, e.g. to determine a gravity vector.

As mentioned above, the distribution of the acceleration measurements also generally includes information indicative of the gravity bias, since the measurements generally lie on a well-defined horizontal 'gravity' plane. Thus, by analysing the distribution of the measurements it is possible to make sense of these properties to also determine the orientation of a horizontal plane bisecting the vehicle into upper and lower parts.

Particularly, once the lateral plane of the vehicle has been determined, e.g. from the measurements obtained during acceleration and deceleration movement phases, as described above, the acceleration measurements obtained during the uniform movement phase can then be suitably projected onto the lateral plane in order to determine the direction of gravity (which is normal to the horizontal plane of the vehicle). Thus, in embodiments, the method comprises using the measured accelerations obtained during the uniform movement phase to determine a gravity vector. In embodiments, the gravity vector is determined using the acceleration measurements obtained during the uniform movement phase and knowledge of the lateral plane of the vehicle (e.g. determined using the acceleration measurements obtained during acceleration/deceleration movement phases, as described above).

In some other embodiments, there is no grouping of the acceleration measurements obtained during the uniform movement phase and thus no direct measurement of the direction of gravity. However, the direction of gravity can be estimated by determining a vector which starts at the origin and runs perpendicular to a vector in the longitudinal direction. The method may comprise determining a longitudinal axis of the vehicle using the measured accelerations obtained during the acceleration and deceleration phases. Thus, in less preferred embodiments, the method comprises using the measured accelerations obtained during the acceleration and deceleration phases to estimate a gravity vector.

The distribution of the acceleration measurements within each of the groups may thus be analysed to determine the relative installation orientation. The acceleration measurements within the groups may generally be processed in any suitable way to extract the orientation information. However, in embodiments, a vector-based approach is used. Particularly, for each group (cluster) of measurements, an average vector can be calculated that points to the average value of the measurements within the group. The average vector for a group (cluster) may be determined for example by performing a vector sum over all of the acceleration measurements within that group. The average vector for a group (cluster) may be obtained from averaging over all of the acceleration measurements stored within that group (cluster). The sum may be suitably weighted, as desired, e.g. to give more significance to acceleration measurements associated with higher speed and/or larger accelerations, in order to further emphasise the longitudinal direction.

Thus, in embodiments, an average acceleration vector can be calculated based on the acceleration measurements obtained during vehicle acceleration phases (and that have been grouped accordingly), as well as an average deceleration vector for the acceleration measurements obtained during vehicle deceleration phases, and (optionally) an average uniform vector for the acceleration measurements obtained during uniform movement phases.

These average vectors can then be suitably processed to determine the desired orientations. For example, because the acceleration measurements obtained during the acceleration and deceleration movement phases are expected to be distributed primarily along the longitudinal axis of the vehicle, the average acceleration and deceleration vectors are both expected to lie in the lateral plane of the vehicle. The normal vector of the lateral plane of the vehicle (and hence the lateral plane of the vehicle) may thus be determined from a cross product of the average acceleration and deceleration vectors.

Similarly, it is expected that the measurements generally will lie on a well-defined horizontal 'gravity' plane. Thus, once the lateral plane of the vehicle has been determined, e.g. from the measurements obtained during acceleration and deceleration movement phases, as described above, the acceleration measurements obtained during the uniform movement phase (or the average uniform vector) can then be suitably projected onto the lateral plane in order to determine the direction of gravity (which is normal to the horizontal plane of the vehicle). Alternatively, as mentioned above, the direction of gravity can be estimated by determining a vector which starts at the origin and runs perpendicular to a vector in the longitudinal direction.

In this way, because the orientation of the lateral plane can be reliably determined using the measurements from the acceleration and deceleration vehicle phases, the inhomogeneity in the uniform phase measurements can be mitigated for, allowing for a more accurate and rapid determination of the gravity vector, e.g. with fewer measurements.

It will be appreciated that the average vectors for each group (cluster) are obtained by averaging over all acceleration measurements within that group (cluster). Thus, as new acceleration measurements are obtained, the average vectors may change. In this way, the orientation determination may be updated, and refined, over time. In embodiments, the average vectors may be calculated using a windowed averaging method, such as a weighted exponential moving average, so that the averages evolve and outliers (or old data) is cancelled out over time. In this way, it may be possible to automatically compensate for any distortions, or changes over time, of the orientation subsequent to the installation process. This technique also reduces the resources needed, as you only store the filter state, instead of all samples of the group.

Once the lateral and horizontal vehicle planes have been calculated, the relative orientation of the accelerometer system with respect to the vehicle is fully determined. That is, from the inherent properties of the distribution of the acceleration measurements, it is possible to directly determine both a lateral and horizontal plane that together define the orientation of the accelerometer system with respect to the vehicle. This can be done so long as there are acceleration measurements for each of the three vehicle phases (uniform movement, acceleration and deceleration), or for the acceleration and deceleration phases at least. Thus, an initial determination of the orientation can be made relatively quickly, with relatively fewer data points, and as more acceleration measurements are obtained, the accuracy of the orientation determination can then be further improved.

Thus, it will be appreciated that the techniques described herein basically use the same inputs as those in WO 2011/003461 A1, but are able to determine the orientation faster, in a more robust and accurate manner. Moreover, the orientation computation can be done in a continuous manner as new measurements are obtained.

So, the advantages of the techniques described herein are being simultaneously fast, robust and precise. Furthermore, the present techniques may use the inherent properties of the input data distribution to compute the orientation directly in one step. First orientation estimations can thus be made with little data and without having to perform complex processing, such as using trigonometric functions. Moreover, the orientation can in embodiments be determined with a relatively higher accuracy, potentially opening up new fields of application (for example, using the accelerometer system to determine the braking force, determining a road inclination 'on-the-fly', or even determining the air resistance (drag coefficient) of the vehicle solely using the accelerometer system).

From the determined orientation, a transformation matrix can then be generated for transforming measurements from the co-ordinate frame of the accelerometer system to the vehicle's frame of reference. To do this, the longitudinal axis may be computed (e.g. from a cross product of the normal vectors to the lateral and horizontal planes, as determined above). The unit vector for the longitudinal axis together with the two unit vectors normal to the lateral and horizontal planes thus define a three-dimensional co-ordinate system that can be used to form a transformation matrix for transforming measurements obtained by the accelerometer in its own reference frame into the vehicle's frame of reference. The transformation matrix can thus be used to generate as output accelerometer measurements within the vehicle's frame of reference.

These transformed measurements can then be provided as output, as desired, to a suitable system or module that is operable to use the accelerometer data. For example, in some embodiments, the transformed acceleration measurements may be provided to a navigation system for supporting the navigation functionality thereof. Alternatively, the transformed measurements may be provided to (remote) server, or to third party, as desired, either for further remote processing, or for monitoring purposes. It is also contemplated that the accelerometer system could send the raw acceleration data to a remote processor so that the determination of the orientation and/or transformation matrix can be performed remotely (reducing the on-board processing requirements).

So, the accelerometer system may be installed as part of, or alongside, a vehicle navigation system for providing acceleration measurements to the navigation system. As another example, the accelerometer system may be provided within a data logging system, e.g. within a dedicated "black box", as part of a telematics system, for monitoring driver or vehicle behaviour. As a yet further example, the accelerometer system may be provided as part of, or alongside, some other on-board system such as an autonomous or advanced driver-assistance module.

It will be appreciated that the present invention is preferably a computer-implemented invention. Any of the steps described in relation to any of the aspects or embodiments of the invention may therefore suitably be carried out under the control of a set of one or more processors and/or suitable processing circuitry. The processing circuitry may generally be implemented either in hardware or software, as desired.

For instance, and without limitation, the means or processing circuitry for carrying out any of the steps described in relation to the method or system may comprise one or more suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner. Thus, it will be appreciated that the methods in accordance with the present invention may be implemented at least partially using software.

Accordingly, it will be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Various features of embodiments of the invention will be described in further detail below.

FIGURES

Various aspects of the teachings of the present invention, and arrangements embodying those teachings, will hereafter be described by way of illustrative example with reference to the accompanying drawings, in which.

DESCRIPTION

Embodiments of the present invention will now be described with particular reference to a system that comprises a navigation device that includes, or is configured to communicate with, an accelerometer. However, it will be appreciated that the teachings of the present invention are not limited to such systems but are instead more generally applicable to any suitable accelerometer system. Furthermore, although in the embodiments described below the navigation device is installed permanently in a vehicle, for example by the manufacturer, in alternative embodiments, the navigation device may be (without limitation) any type of route planning and/or navigation device, irrespective of whether that device is embodied as a portable navigation device (PND), a navigation device built into a vehicle, or indeed a computing resource (such as a desktop or portable personal computer (PC), mobile telephone or portable digital assistant (PDA)) executing route planning and/or navigation software.

Figure 1:
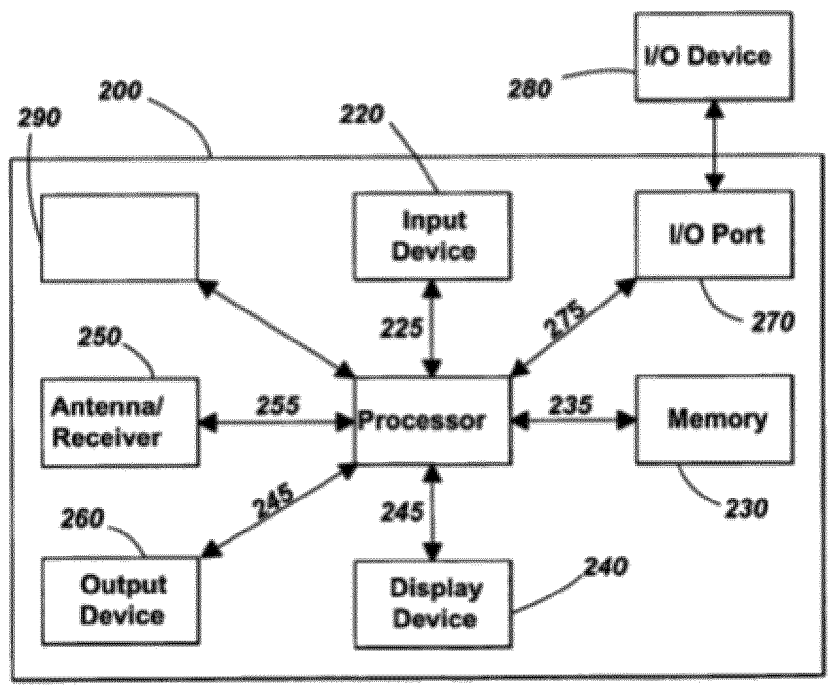
FIG. 1 is a schematic illustration of the electronic components of a typical navigation device may use the methods according to embodiments of the present invention.

FIG. 1 is an illustrative representation of electronic components of a typical navigation device 200 that may use the methods according to embodiments of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In one arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In FIG. 1, the navigation device includes an accelerometer 290, and the processor 210 is configured to communicate with the accelerometer as described in more detail below. In the navigation device 200 shown in FIG. 1, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 1 further illustrates an operative connection between the processor 210 and an antenna/receiver 250 via connection 255, wherein the antenna/receiver 250 can be a GPS antenna/receiver, for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 1 are powered by power sources (not shown) in a conventional manner. As will be understood by one of ordinary skill in the art, different configurations of the components shown in FIG. 1 are considered to be within the scope of the present application. For example, the components shown in FIG. 1 may be in communication with one another via wired and/or wireless connections and the like.

Figure 2:
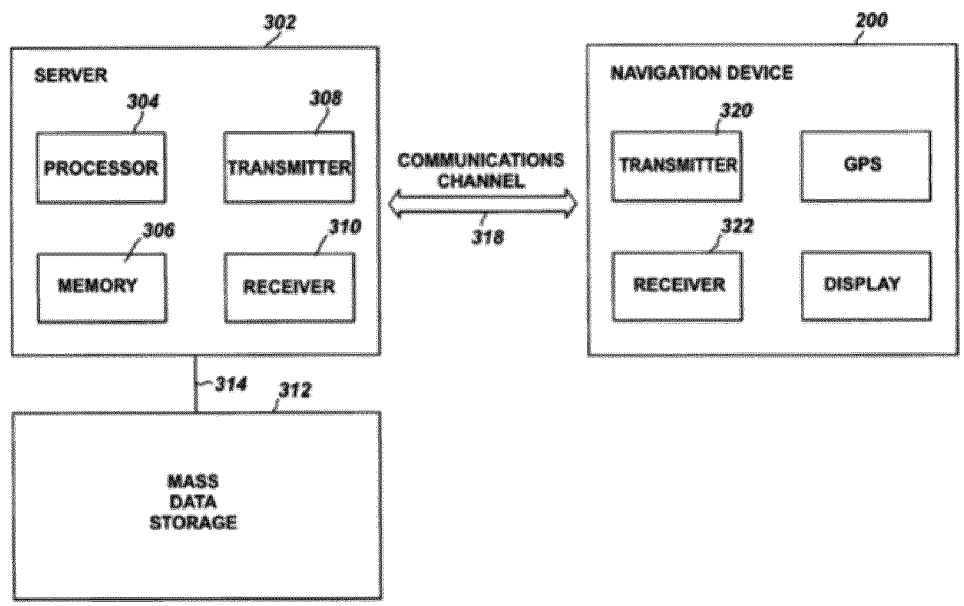
FIG. 2 is a schematic diagram of a communications system including a wireless communication channel for communication with the navigation device.

Referring now to FIG. 2, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service) connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 2 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 1, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel. The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology. The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs; however, processor 210 of navigation device 200 can also handle much processing and calculation, oftentimes independent of a connection to a server 302.

Figure 3:
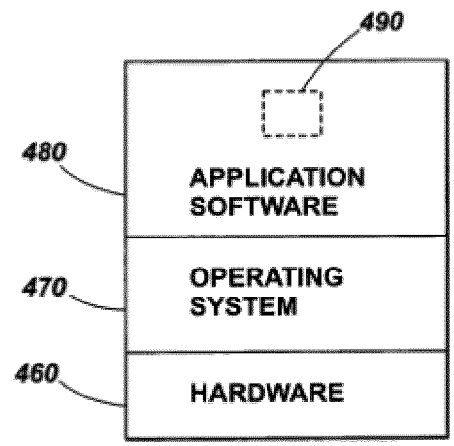
FIG. 3 is a schematic representation of an architectural stack of the navigation device of FIG. 1.

Referring now to FIG. 3 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith.

The application software 480 also includes an accelerometer module 490 that is configured to receive and process accelerometer data from the accelerometer 290. The function and operation of the accelerometer module 490 is described in more detail below.

When the user switches on the device 200, the device 200 acquires a GPS fix and calculates (in a known manner) the current location of the navigation device 200. The location is calculated using a location determining unit comprising the antenna/receiver 250, the connection 255 and a location determining module (not shown) included in the processor 210. The user is then presented with a view in pseudo three dimensions on a touch screen display 240 of the local environment 494 in which the navigation device 200 is determined to be located, and in a region 496 of the display 240 below the local environment a series of control and status messages. The device 200 provides route planning, mapping and navigation functions to the user, in dependence on user input provided by a series of interlinked soft or virtual buttons and menu screens that can be displayed on the display 240. The device 200 continues to determine its location using the location determination unit on an on-going basis whilst it is operational.

The accelerometer 290 in certain embodiments is a three-axis accelerometer and measures acceleration along each of three orthogonal axes (x, y, z). The accelerometer may be an analogue or digital acceleration sensor and can be of any type. In one embodiment, the accelerometer is a Bosch Sensortec SMB380 tri-axial acceleration sensor.

In operation, the accelerometer continuously provides data representing the results of accelerometer measurements to the accelerometer module 490 operating at the processor 210. The data provided by the accelerometer comprises acceleration data for each axis (x, y, z) of the accelerometer. The accelerometer module 490 treats data representative of each measurement as an accelerometer output data item. Each accelerometer data item comprises, or can be processed to provide, a measured acceleration vector $a=(a_x, a_y, a_z)$. The measurement may be performed at a single instant, or may be averaged over a period of time. The averaging can be performed by the accelerometer 290 itself or by the accelerometer module 490.

The accelerometer data items are stored in the memory 230 for subsequent transmission to the server 302 and/or processing. In one mode of operation the accelerometer data items are processed either by the accelerometer module 490 or the server 302 in order to identify whether exceptional driving events (for example, harsh braking or acceleration, swerving or other emergency manoeuvres) have occurred during a period of time.

If the accelerometer 290 is stationary (not moving), or moving at a constant uniform speed, the magnitude of the acceleration vector $a=(a_x, a_y, a_z)$ is substantially equal to the Earth's gravity (g) (static acceleration). On the other hand, if the device 200 is being moved, additional forces acting on the accelerometer 290 can be determined from the measured acceleration vector, compensated for the acceleration vector when the device is stationary (i.e. for gravity g).

However, the magnitude of the gravity g determined by the accelerometer 290 differs under changing temperatures or other environmental conditions due to the effect of such changing temperatures or other environmental conditions on operation of the accelerometer 290.

Furthermore, the vector components $a_x$, $a_y$ and $a_z$ of the acceleration vector when the device is stationary depend on the orientation of the accelerometer with respect to the ground at that time. Naturally, this will depend on the orientation at which the device 200 (and hence the accelerometer 290) is installed within the vehicle, as well as the orientation of the vehicle with respect to the ground (i.e. the ground inclination).

It is normally the behaviour of the vehicle that is of interest (rather than the accelerometer itself). Thus, to be able to use the measurements provided by the accelerometer 290 it is thus necessary to be able to transform the accelerometer measurements into the vehicle's frame of reference. This requires determining the orientation of the accelerometer 290 within the vehicle.

Figure 4:
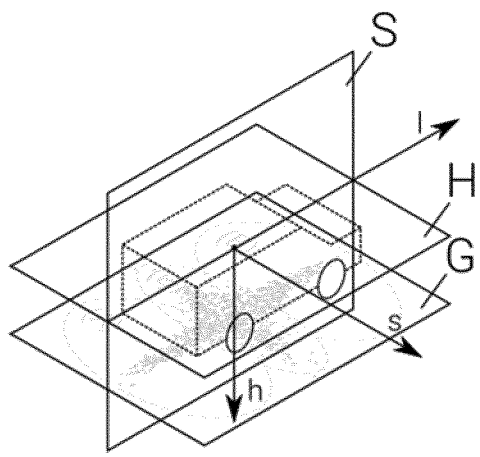
FIG. 4 illustrates a defined co-ordinate system for a vehicle.

FIG. 4 shows a perspective view of a vehicle within which the device 200 may suitably be installed. In particular, FIG. 4 illustrates a vehicle co-ordinate system having a longitudinal axis (I), a vertical axis (h) and a lateral axis (s). FIG. 4 also illustrates the lateral plane (S) of the vehicle bisecting the vehicle laterally along its longitudinal axis (I) (which plane is normal to the lateral axis (s)), the horizontal vehicle plane (H) bisecting the vehicle vertically along its longitudinal axis (I). FIG. 4 also shows the horizontal gravity plane (G).

Figure 5:
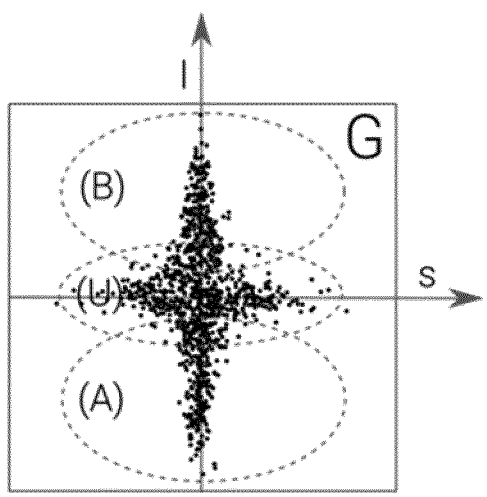
FIG. 5 shows a typical distribution of acceleration measurements within the gravity plane, and illustrates how these measurements may be clustered according to a first embodiment of the present invention.

FIG. 5 then shows a typical distribution of accelerometer measurements within the gravity plane (G), with the longitudinal (I) and lateral (s) axes of the vehicle also depicted. As can be seen, the distribution of the acceleration samples shows a clear sample accumulation along the longitudinal axis (I) of the vehicle the accelerometer is installed in. This is the primary axis of vehicle movement. There are also other data samples that do not fall along the longitudinal axis, but it can be seen that the majority of data points fall close to the longitudinal axis. The distribution also indicates the gravity bias. That is, all of the data points generally lie within the gravity plane (G), whose distance to the origin is in fact the gravity magnitude. Vehicle cornering deflects a sample orthogonal from the longitudinal vehicle axis (I) on the gravity plane (G). A tilt of the vehicle due to road inclination rotates the gravity plane (G) around the origin of the lateral plane (S).

The present method is able to make sense out of these properties so that the orientation of the accelerometer with respect to the vehicle frame can be determined. In a first embodiment, it does this by classifying the acceleration data samples into three clusters, representing:

1. (U) Uniform Movement of the Vehicle (speed is constant, excluding standstill)
2. (A) Acceleration of the vehicle (speed increasing)
3. (B) Braking of the vehicle (speed decreasing)

In some examples, these clusters can be formed using a vehicle speed signal which could be provided either by a sensor on the device 200 (e.g. a GPS sensor 250), or may be obtained from the vehicle itself and then provided to the device 200 via a standard interface to the accelerometer box (e.g. CAN, OBD, FMS).

If the speed signal does not change, the acceleration sample is classified as belonging to cluster (U). If the speed signal increases, the sample is classified as belonging to cluster (A), and if it decreases, the sample is classified as belonging to cluster (B) (see e.g. Eq. 1).

$$U = \{(1, \vec{x}) : \Delta v \approx 0, v \neq 0\}$$

$$A = \{(\Delta v, \vec{x}) : \Delta v > 0\}$$

$$B = \{(|\Delta v|, \vec{x}) : \Delta v < 0\} \qquad \text{Eq. 1: Cluster U, A, B}$$

In this way, the method generates three clusters of samples along the longitudinal axis (I), as shown in FIG. 5.

Of course, zero can be replaced by a small threshold in Eq. 1 to filter out noise. This is one way of establishing a relationship between the vehicle's and device's acceleration data. Because you know the primary movement axis is longitudinal, you know that the groups are also laid out on this direction.

In some examples, these clusters can be formed using an independent vehicle acceleration signal obtained from the vehicle itself, e.g. provided to the device 200 via a standard interface to the accelerometer box (e.g. CAN, OBD, FMS). The vehicle's longitudinal acceleration signal may be used instead of the derivative of the vehicle's speed signal in Eq. 1. If the acceleration signal is zero, the acceleration sample is classified as belonging to cluster (U). If the acceleration signal has a positive value, the sample is classified as belonging to cluster (A), and if the acceleration signal has a negative value, the sample is classified as belonging to cluster (B).

It can be seen from FIG. 5 that the (U) cluster is somewhat inhomogeneous, primarily due to the unknown inclination of the road. This makes this data unreliable to be used as direct input data. On the other hand, the (A) and (B) clusters are more focused along the longitudinal axis (I) and can suitably be used to compute the lateral vehicle plane (S) splitting the vehicle laterally into a left and right part (and thus representing two thirds of the orientation determination).

Furthermore, once the lateral vehicle plane (S) has been obtained, the unreliable (U) measurements can then be projected onto the lateral vehicle plane (S) to determine the direction of gravity h. In this way, most of the inhomogeneity in the (U) cluster can be removed. The gravity direction (h) defines the horizontal plane (H) of the vehicle splitting the vehicle into an upper and a lower part. The lateral (S) and horizontal (H) planes combined completely describe the orientation of the accelerometer (box) with respect to the vehicle.

Figure 6:
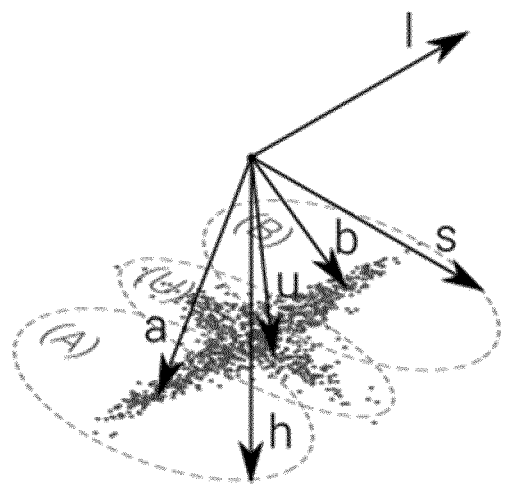
FIG. 6 shows how the three clusters of measurements may be defined relative to the vehicle's co-ordinate frame.

The lateral vehicle plane (S) is computed by using a weighted average of the clusters (A) and (B) which gives the average acceleration and deceleration vectors a and b (see Eq. 2), as depicted in FIG. 6. The weighting is based on speed deltas and gives acceleration samples with higher speed delta more significance. This emphasizes the longitudinal direction even more. By applying the cross product to the average acceleration vector a and the average deceleration vector b, the normal vector s of the lateral plane (S) can thus be computed (see Eq. 3). The vector s is thus the lateral axis of the vehicle and fully describes the lateral plane (S) touching the coordinate origin.

Weighted cluster means are the cluster centers  Eq. 2

$$\vec{u} = \sum_{(w, \vec{x}) \in U} w \cdot \vec{x}$$

$$\vec{a} = \sum_{(w, \vec{x}) \in A} w \cdot \vec{x}$$

$$\vec{b} = \sum_{(w, \vec{x}) \in B} w \cdot \vec{x}$$

Lateral direction s and gravity direction g  Eq. 3

$$\vec{s} = \vec{b} \times \vec{a}$$

$$\vec{e}_s = \frac{\vec{s}}{\|\vec{s}\|}$$

$$\vec{h} = \vec{u} - \vec{e}_s \cdot \langle \vec{e}_s, \vec{u} \rangle$$

$$\vec{e}_h = \frac{\vec{h}}{\|\vec{h}\|}$$

To form a transformation matrix T from the accelerometer coordinate system to the vehicle coordinate system, the longitudinal axis direction I needs to be computed as well. This can be done by applying the cross product to the gravity vector (h) and the lateral vector (s). The unit vectors of I, s and h now form the matrix T as concatenated row vectors, see Eq. 4:

Longitudinal direction $l$ and transformation T  Eq. 4

$$\vec{l} = \vec{e}_h \times \vec{e}_s$$

$$\vec{e}_l = \frac{\vec{l}}{\|\vec{l}\|}$$

$$T = [\vec{e}_l, \vec{e}_s, -\vec{e}_h]^T$$

The weighted average cluster centres of (U), (A) and (B) can be obtained by storing all seen acceleration samples and their weight per cluster or by applying a weighted windowed averaging method like "Weighted Exponential Moving Average" so that the averages evolve and outliers cancel out over time.

In a second embodiment, the acceleration data samples are classified into two clusters, representing:

(A) Acceleration of the vehicle (speed increasing); and (B) Braking of the vehicle (speed decreasing).

As described above, these clusters can be formed using a vehicle speed signal or an independent vehicle acceleration signal obtained from the vehicle itself. Eq. 1 still applies for clusters (A) and (B). In this way, the method generates two clusters of samples along the longitudinal axis (I), as shown in FIG. 7.

Figure 7:
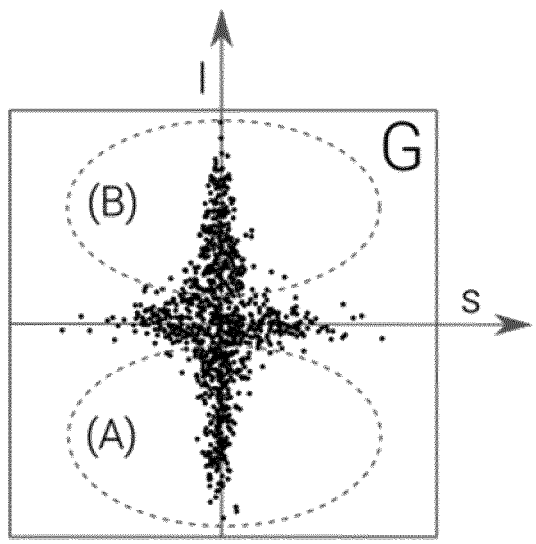
FIG. 7 shows a typical distribution of acceleration measurements within the gravity plane, and illustrates how these measurements may be clustered according to a second embodiment of the present invention.
Figure 8:
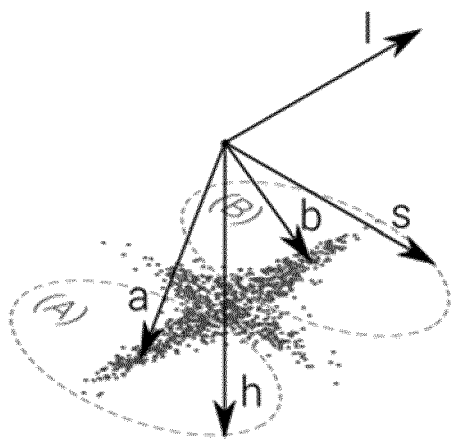
FIG. 8 shows how the two clusters of measurements may be defined relative to the vehicle's co-ordinate frame.

Referring to FIG. 7, it can be seen that the (A) and (B) clusters are focused along the longitudinal axis (I) and can suitably be used to compute the lateral vehicle plane (S) splitting the vehicle laterally into a left and right part (and thus representing two thirds of the orientation determination). By omitting the group (U) there's no direct measurement of the gravitational direction. However, it can be estimated by determining the vector which starts at the origin and is perpendicular to the vector from (A) to (B). Instead of projecting (U) to the lateral plane and determining the longitudinal vector (I) afterwards, the longitudinal axis (I) is determined directly by setting it equal to the vector between (A) and (B), as shown in FIG. 8. This is a coarse estimation of the longitudinal direction and very likely affected by unbalanced relation of acceleration to deceleration data. After computing (I), the gravity vector (h) can be computed from (I) and (s) by cross product. Instead of Eq. 3-4, the following Eq. 5-6 may be applied:

Lateral direction $s$ and longitudinal direction $l$     Eq. 5

$$\vec{s} = \vec{b} \times \vec{a}$$
$$\vec{e}_s = \frac{\vec{s}}{\|\vec{s}\|}$$
$$\vec{l} = \vec{b} - \vec{a}$$
$$\vec{e}_l = \frac{\vec{l}}{\|\vec{l}\|}$$

Gravity direction $h$ and transformation $T$     Eq. 6

$$\vec{h} = \vec{e}_l \times \vec{e}_s$$
$$\vec{e}_h = \frac{\vec{h}}{\|\vec{h}\|}$$
$$T = [\vec{e}_l, \vec{e}_s, -\vec{e}_h]^T$$

The algorithm variant which uses two instead of three groups of acceleration measurements is slightly different and less robust.

Figure 9:
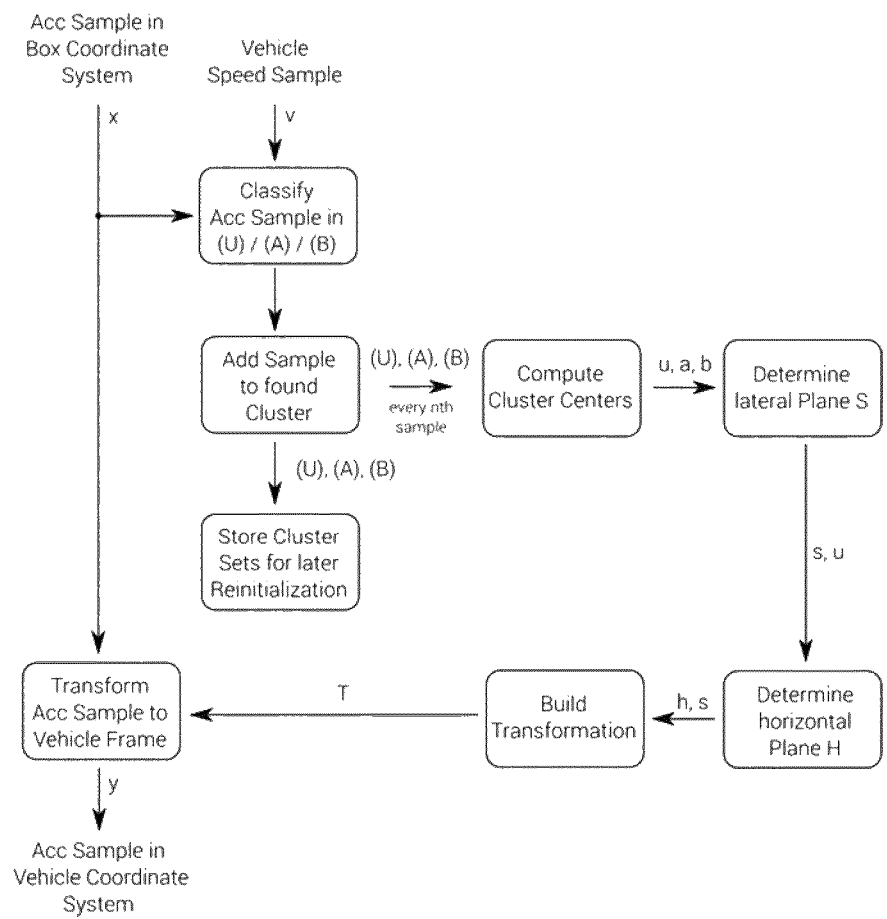
FIG. 9 is a flowchart illustrating a method according to the first embodiment of the present invention.

An example of the overall method according to the first embodiment of the present invention is shown in FIG. 9. The method starts with an input acceleration measurement sample in the co-ordinate frame of the accelerometer (or box). This sample is then classified into one (or more) of the clusters (U), (A) and (B) using the vehicle speed (or acceleration), and added to the respective cluster set. The set of clusters are stored, e.g. for later initialisation. Periodically, e.g. for every nth measurement sample, the cluster centres are (re)computed, and then used, in the manner described above, to determine the lateral plane (S) and then horizontal plane (H) of the vehicle. Once the orientation is known, the transformation from the accelerometer co-ordinate frame into the vehicle's frame of reference can then be built, and the input acceleration measurement sample can thus be transformed into the vehicle's frame to give as output the acceleration as measured in the vehicle's co-ordinate frame.

The method allows for an orientation update with every new sample if at least one sample in every cluster is available. One could also decide to update the orientation only after every nth sample to save resources. The cluster information can be stored for later re-initialization of the computation.

The progress and quality of the method can be tracked by comparing older orientation results with new ones by computing an angle between the subsequent transformations, defining a threshold angle below which the orientation estimation is considered as valid. By defining another threshold for maximum transformation deviation, a reorientation/reinstallation of the accelerometer can be detected.

The accelerometer module 490 is usually configured to update the accelerometer output data set, and to recalculate the average stationary acceleration vector or other orientation output, on an on-going basis during normal use of the device 200 and vehicle 500. The accelerometer module 490 is configured to maintain a predetermined number of accelerometer output data items in the data set on a first-in-first-out basis and/or is configured to delete accelerometer output data items from the data set when they become older than a predetermined age.

As mentioned above, the accelerometer 290 is sensitive to environmental conditions, for example temperature. In one variant of the embodiment of FIG. 1, the accelerator module is configured to receive temperature data from a temperature sensor (not shown) that is either external to or integrated in the device 200. In one example the temperature sensor is the vehicle's temperature sensor and the device 200 is interfaced to that sensor. The accelerometer module 490 only selects accelerometer output data items for inclusion in the accelerometer data set if the temperature at the time of measurement is below a predetermined maximum temperature and/or above a predetermined minimum temperature (for example between 5° C. and 35° C.). The threshold maximum and minimum values of temperature may be selected in dependence on the normal operating temperature range for the particular accelerometer that is used.

The orientation of the accelerometer 290 with respect to the vehicle 500 determined by the accelerometer module 490 can also be provided by the accelerometer module 490 to the location determining unit for use in location determination. In embodiments in which the accelerometer 290 forms an integral part of the device 200 and is in a known orientation with respect to antennas or other components of the location determination unit, the orientation can be used to control or optimise reception or processing of GPS or other signals.

Figure 10:
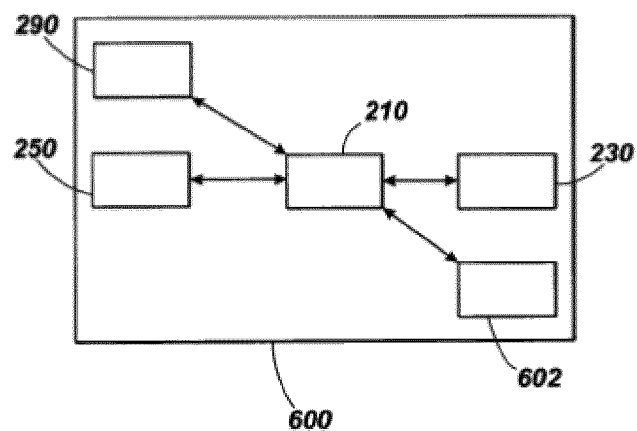
FIG. 10 is a schematic illustration of an alternative embodiment in which an accelerometer is included in a data logger device.

In the embodiment of FIG. 1, the accelerometer 290 is integrated in, or in communication with, a navigation device that provides navigation functions to a user under control of the user. In alternative embodiments, the accelerometer is included in a data logger device that logs location data and/or accelerometer data and/or other vehicle data and communicates such data to the server 302. An example of such an alternative embodiment is illustrated in FIG. 10, which shows a black-box type device 600 for installation in a vehicle.

The device 600 includes some of the components of the device 200, including the accelerometer 290, the processor 210, the memory 230, and the antenna/receiver 250. The temperature or other environmental sensor 602 is also shown in FIG. 8. The device 600 is optionally also able to interface with vehicle systems to obtain and log other vehicle data. The location-determining and accelerometer functions of device 600 are as described in relation to the device 200 of FIG. 2, but the device 600 does not provide navigation or display functions to the driver of a vehicle but instead logs and transmits data to the server 302 for subsequent analysis. The device 600 is particularly suitable for installation in a commercial vehicle. Both the device 600 and the device 200 may be used in commercial vehicle and fleet management systems, for example the TomTom Work and TomTom Webfleet systems.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Whilst some embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be appreciated that embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst embodiments described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will thus be understood that the present invention has been described above purely by way of example, and modifications of detail can be made within the scope of the invention. Each feature disclosed in the description, and (where appropriate) the claims and drawings may be provided independently or in any appropriate combination. Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

Thus, although the present invention has been described with reference to various embodiments, it will be understood by those skilled in the art that various changes in form and detail may be made without departing from the scope of the invention as set forth in the accompanying claims. It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A method for determining an orientation of an accelerometer system relative to a vehicle within which it is installed, wherein the accelerometer system is a multi-axial accelerometer system capable of measuring acceleration values for each of the axes of the accelerometer system to provide an acceleration measurement in the co-ordinate frame of the accelerometer system, the method comprising:
   obtaining a plurality of acceleration measurements from the accelerometer system whilst the vehicle is moving, wherein each of the acceleration measurements is representative of an acceleration as measured within the co-ordinate frame of the accelerometer system; and
   analysing a distribution of the accelerations as measured within the co-ordinate frame of the accelerometer to determine an orientation of the accelerometer system relative to the vehicle within which it is installed.

2. The method of claim 1, comprising grouping the acceleration measurements according to whether the measurements were obtained during an acceleration or deceleration phase, and using the distribution of the accelerations within each of the groups to determine the orientation of the accelerometer system.

3. The method of claim 2, comprising obtaining for each of the acceleration measurements a speed signal indicating a speed of the vehicle, and grouping the measured accelerations using the obtained speed signals.

4. The method of claim 2, comprising determining the orientation of a lateral plane of the vehicle using the measured accelerations obtained during the acceleration and deceleration phases.

5. The method of claim 4, comprising determining an average acceleration vector for the measured accelerations obtained during the acceleration phase and an average deceleration vector for the measured accelerations obtained during the deceleration phase, and determining a normal vector of the lateral plane by calculating a cross-product of the average acceleration and deceleration vectors.

6. The method of claim 5, comprising determining a longitudinal axis of the vehicle and/or a gravity vector using the measured accelerations obtained during the acceleration and deceleration phases.

7. The method of claim 6, comprising using the measured accelerations obtained during a uniform movement phase to determine a gravity vector by projecting the measured accelerations, or an average uniform vector determined therefrom, onto the determined lateral plane.

8. The method of claim 7, comprising determining a horizontal plane of the vehicle normal to the gravity vector.

9. The method of claim 7, comprising determining a longitudinal axis of the vehicle by a cross product of the gravity vector and the normal vector of the lateral plane.

10. The method of claim 1, comprising further grouping the acceleration measurements according to whether the measurements were obtained during a uniform movement phase when the vehicle was moving at a substantially constant non-zero speed.

11. The method of claim 1, comprising determining a transformation matrix for transforming accelerometer measurements to the vehicle co-ordinate system.

12. The method of claim 1, comprising continuously or periodically updating the orientation determination when new acceleration measurements are obtained.

13. A computer readable storage medium storing software code that when executing on a data processor performs a method as claimed in claim 1.

14. An apparatus comprising:
   a multi-axial accelerometer system capable of measuring acceleration values for each of the axes of the accelerometer system to provide an acceleration measurement in the co-ordinate frame of the accelerometer system; and
   one or more processor(s) operable to:
      obtain a plurality of acceleration measurements from the accelerometer system whilst the vehicle is moving, wherein each of the acceleration measurements is representative of an acceleration as measured within the co-ordinate frame of the accelerometer system; and
      analyse a distribution of the accelerations as measured within the co-ordinate frame of the accelerometer to determine an orientation of the accelerometer system relative to the vehicle within which it is installed.

15. The apparatus of claim 14, wherein the one or more processors are operable to: group the acceleration measurements according to whether the measurements were obtained during an acceleration phase, or during a deceleration phase; and use the distribution of the accelerations within the groups to determine the orientation of the accelerometer system relative to the vehicle within which it is installed.

16. The apparatus of claim 15, wherein the one or more processor(s) are operable to: further group the acceleration measurements according to whether the measurements were obtained during a uniform movement phase when the vehicle was moving at a substantially constant non-zero speed.

* * * * *